(12) United States Patent
Yu et al.

(10) Patent No.: US 12,033,080 B2
(45) Date of Patent: Jul. 9, 2024

(54) SPARSE RECOVERY AUTOENCODER

(71) Applicant: GOOGLE LLC, Mountain View, CA (US)

(72) Inventors: Xinnan Yu, New York, NY (US); Shanshan Wu, Austin, TX (US); Daniel Holtmann-Rice, Albany, CA (US); Dmitry Storcheus, New York, NY (US); Sanjiv Kumar, Jericho, NY (US); Afshin Rostamizadeh, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 1426 days.

(21) Appl. No.: 16/442,203

(22) Filed: Jun. 14, 2019

(65) Prior Publication Data
US 2019/0385063 A1 Dec. 19, 2019

Related U.S. Application Data

(60) Provisional application No. 62/685,418, filed on Jun. 15, 2018.

(51) Int. Cl.
*G06N 3/084* (2023.01)
*G06F 17/16* (2006.01)
*G06N 3/02* (2006.01)
*G06N 3/045* (2023.01)

(52) U.S. Cl.
CPC ............ *G06N 3/084* (2013.01); *G06F 17/16* (2013.01); *G06N 3/02* (2013.01); *G06N 3/045* (2023.01)

(58) Field of Classification Search
CPC .......... G06N 3/02; G06N 3/045; G06N 3/084
See application file for complete search history.

(56) References Cited

U.S. PATENT DOCUMENTS 10,970,629 B1 * 4/2021 Dirac ....................... G06N 7/01
2020/0175732 A1 * 6/2020 Andreyev ............... G06T 15/08

OTHER PUBLICATIONS

Gilbert et al. "Algorithmic Linear Dimension Reduction in the l1 Norm for Sparse Vectors", 2006, arXiv:cs/0608079v1.*

(Continued)

*Primary Examiner* — Markus A. Vasquez
(74) *Attorney, Agent, or Firm* — Brake Hughes Bellermann LLP

(57) ABSTRACT

A sparse dataset is encoded using a data-driven learned sensing matrix. For example, an example method includes receiving a dataset of sparse vectors with dimension d from a requesting process, initializing an encoding matrix of dimension k×d, selecting a subset of sparse vectors from the dataset, and updating the encoding matrix via machine learning. Updating the encoding matrix includes using a linear encoder to generate an encoded vector of dimension k for each vector in the subset, the linear encoder using the encoding matrix, using a non-linear decoder to decode each of the encoded vectors, the non-linear decoder using a transpose of the encoding matrix in a projected subgradient, and adjusting the encoding matrix using back propagation. The method also includes returning an embedding of each sparse vector in the dataset of sparse vectors, the embedding being generated with the updated encoding matrix.

20 Claims, 9 Drawing Sheets

(56) References Cited

OTHER PUBLICATIONS

Abolghasemi et al. "On Optimization of the Measurement Matrix for Compressive Sensing", 2010, 18th European Signal Processing Conference.*

Han et al. "A Sparse autoencoder compressed sensing method for acquiring the pressure array information of clothing", 2017, Neurocomputing 275.*

Aharon et al., "An Algorithm for Designing Overcomplete Dictionaries for Sparse Representation", IEEE Transactions on Signal Processing, vol. 54, No. 11, Nov. 2006, pp. 4311-4322.

Amos et al., "Optnet: Differentiable Optimization as a Layer in Neural Networks", Proceedings of the 34th International Conference on Machine Learning (ICML), 2017, 10 pages.

Baraniuk et al., "Model-Based Compressive Sensing", IEEE Transactions on Information Theory, vol. 56, No. 4, Dec. 9, 2009, 20 pages.

Blumensath et al., "Iterative Hard Thresholding for Compressed Sensing", Applied and Computational Harmonic Analysis, vol. 27, No. 3, Jan. 28, 2009, pp. 265-274.

Boutsidis et al., "Online Principal Components Analysis", In Proceedings of the Twenty-Sixth Annual ACM-SIAM Symposium on Discrete Algorithms (SODA), Society for Industrial and Applied Mathematics, 2015, pp. 887-901.

Boyd, "Subgradient Methods", Notes for EE364b, Stanford University, Spring, May 2014, 39 pages.

Candes et al., "Robust Uncertainty Principles: Exact Signal Reconstruction from Highly Incomplete Frequency Information", IEEE Transactions on Information Theory, vol. 52, No. 2, Feb. 2006, pp. 489-509.

Arias-Castro et al., "On the Fundamental Limits of Adaptive Sensing", retrieved from web: https://arxiv.org/pdf/1111.4646, Aug. 2012, 16 pages.

Chandrasekaran et al., "The Convex Geometry of Linear Inverse Problems", Foundations of Computational Mathematics, vol. 12, No. 6, Oct. 16, 2012, pp. 805-849.

Donoho, "Compressed Sensing", IEEE Transactions on Information Theory, vol. 52, No. 4, Apr. 2006, pp. 1289-1306.

Donoho et al., "Message-Passing Algorithms for Compressed Sensing", Proceedings of the National Academy of Sciences, vol. 106, No. 45, Nov. 10, 2009, pp. 18914-18919.

Donoho, et al., "Optimally Sparse Representation in General (nonorthogonal) Dictionaries via l1 Minimization", Proceedings of the National Academy of Sciences, vol. 100, No. 5, Mar. 4, 2003, 7 pages.

Donoho et al., "Sparse Nonnegative Solution of Underdetermined Linear Equations by Linear Programming", Proceedings of the National Academy of Sciences of the United States of America, vol. 102, No. 27, Jul. 5, 2005, pp. 9446-9451.

Candes, "The Restricted Isometry Property and its Implications for Compressed Sensing", Comptes Rendus Mathematique, vol. 346, No. 9-10, Apr. 11, 2008, pp. 589-592.

Erhan et al., "Why Does Unsupervised Pre-Training Help Deep Learning?", Journal of Machine Learning Research, vol. 11, Feb. 2010, pp. 625-660.

Gregor et al., "Learning Fast Approximations of Sparse Coding", In Proceedings of the 27th International Conference on Machine Learning (ICML), 2010, pp. 399-406.

Haviv et al., "The Restricted Isometry Property of Subsampled Fourier Matrices", In Geometric Aspects of Functional Analysis, Springer, 2017, 16 pages.

He et al., "From Bayesian Sparsity to Gated Recurrent Nets", 31st Conference on Neural Information Processing Systems (NIPS), 2017, pp. 5560-5570.

Hegde et al., "Approximation-Tolerant Model-Based Compressive Sensing", In Proceedings of the twenty-fifth annual ACM-SIAM symposium on Discrete algorithms (SODA), SIAM, 2014, pp. 1544-1561.

Hinton et al., "Reducing the Dimensionality of Data with Neural Networks", Science, vol. 313, No. 5786, Jul. 28, 2006, pp. 504-507.

Rauhut, "Compressive Sensing and Structured Random Matrices", Radon Series Comp. Appl. Math XX, Jun. 12, 2011, 94 pages.

Zhang et al., "ISTA-Net: Iterative Shrinkage-Thresholding Algorithm Inspired Deep Network for Image Compressive Sensing", retrieved from web: https://arxiv.org/pdf/1706.07929v1.pdf, Jun. 2017, 15 pages.

Ioffe et al., "Batch Normalization: Accelerating Deep Network Training by Reducing Internal Covariate Shift", In Proceedings of the 32nd International Conference on Machine Learning (ICML), Mar. 2015, 11 pages.

Khajehnejad et al., "Sparse Recovery of Nonnegative Signals with Minimal Expansion", IEEE Transactions on Signal Processing, vol. 59, No. 1, Jan. 2011, pp. 196-208.

Kingma et al., "Auto-Encoding Variational Bayes", retrieved from web: https://arXiv:1312.6114v10 [stat.ML], May 1, 2014, 14 pages.

Li et al., "Diffusion Approximations for Online Principal Component Estimation and Global Convergence", 31st Conference on Neural Information Processing Systems (NIPS 2017), 2017, 11 pages.

Mairal et al., "Online Dictionary Learning for Sparse Coding", In Proceedings of the 26th Annual International Conference on Machine Learning (ICML), 2009, pp. 689-696.

Malloy et al., "Near-Optimal Adaptive Compressed Sensing", IEEE Transactions on Information Theory, vol. 60, No. 7, Apr. 2014, 13 pages.

Mardani et al., "Recurrent Generative Adversarial Networks for Proximal Learning and Automated Compressive Image Recovery", retrieved from web: https://arxiv.org/pdf/1711.10046.pdf, Nov. 2017, 12 pages.

Mousavi et al., "A Deep Learning Approach to Structured Signal Recovery", In Communication, Control, and Computing (Allerton), 2015 53rd Annual Allerton Conference on, IEEE, Aug. 17, 2015, pp. 1336-1343.

Mousavi et al., "Deepcodec: Adaptive Sensing and Recovery Via Deep Convolutional Neural Networks", In 55th Annual Allerton Conference on Communication, Control and Computing, Jul. 2017, 8 pages.

Mousavi et al., "Learning to Invert: Signal Recovery via Deep Convolutional Networks.", retrieved from web: https://arXiv:1701.03891v1 [stat.ML], Jan. 2017, 5 pages.

Needell et al., "CoSaMP: Iterative Signal Recovery from Incomplete and Inaccurate Samples", Applied and Computational Harmonic Analysis, vol. 26, No. 3, 2009, pp. 301-321.

Olshausen et al., "Emergence of Simple-Cell Receptive Field Properties by Learning a Sparse Code for Natural Images", Nature, vol. 381, No. 6583, Jun. 13, 1996, pp. 607-609.

Sprechmann et al., "Learning Efficient Sparse and Low Rank Models", retrieved from web https://arxiv.org/pdf/1212.3631.pdf, 35 pages.

Tropp et al., "Signal Recovery From Random Measurements via Orthogonal Matching Pursuit", IEEE Transactions on Information Theory, vol. 53, No. 12, Dec. 2007, pp. 4655-4666.

Pan, "How Bad are Vandermonde Matrices?", Journal on Matrix Analysis and Applications, vol. 37, No. 2, 2016, pp. 676-694.

Vincent et al., "Stacked Denoising Autoencoders: Learning Useful Representations in a Deep Network with a Local Denoising Criterion", Journal of Machine Learning Research, vol. 11, Dec. 2010, pp. 3371-3408.

Wu et al., "Single Pass PCA of Matrix Products", In Advances in Neural Information Processing Systems (NIPS), 2016, pp. 2585-2593.

Xin et al., "Maximal Sparsity with Deep Networks?", In Advances in Neural Information Processing Systems (NIPS), 2016, pp. 4340-4348.

\* cited by examiner

SPARSE RECOVERY AUTOENCODER

RELATED APPLICATION

This application is a non-provisional of, and claims priority to, U.S. Provisional Application No. 62/685,418, filed Jun. 15, 2018, titled "A Sparse Recovery Autoencoder," the disclosure of which is incorporated herein in its entirety.

BACKGROUND

Many data mining and machine learning tasks operate on sparse vectors. Many such tasks relate to nearest neighbor problems, or in other words finding similarities between entities represented by the vectors. Sparse vectors have a high dimensionality (d), but very few of the dimensions have data. For example, a dataset of such vectors may represent the songs listened to, with each vector position representing a different song. Such a dataset would have millions or even billions of vector positions (dimensions), but very few of them would have non-zero values.

Many data mining operations encode, or compress, the data, so that the vectors have a lower dimension for processing tasks, e.g., finding nearest neighbors. Linear encoding, a popular method that uses a randomly-generated encoding matrix to encode the sparse vectors, does not provide optimal results because it is data-independent (e.g., does not account for a-priori unknown structure in the underlying data). Data-driven encoding, such as Principal Components Analysis (PCA), uses an encoder and decoder that are linear and learned from samples, but does not recover the sparse vector well. In other words, PCA has poor recall when used on sparse datasets.

SUMMARY

Implementations provide a linear encoder and a complex non-linear decoder that learns a data-driven encoding matrix A for a particular sparse dataset. Because the data-driven matrix A is learned, the underlying structure of the sparse dataset is discovered and not known ahead of time. Implementations use machine learning (e.g., via a neural network) in a training mode to identify a data-driven encoding matrix A for a given sparse, high-dimensional dataset. In training mode, the system starts with a random matrix A (e.g., populated via Gaussian distribution) and uses a linear encoder and a complex non-linear decoder to generate the data-driven matrix A. More specifically, during training a sample set of vectors are encoded using A and then decoded, and the reconstruction error determined. The system uses backpropagation to update A to minimize this reconstruction error over several training rounds. The decoder uses a limited number (e.g., S) of steps in a conventional $l_1$-minimization decoder. Conventionally, an $l_1$-minimization decoder runs until convergence, but this running time would make the training time impossibly long. The proposed system replaces the conventional $l_1$-minimization decoder with an S-step projected subgradient update. In some implementations, the computationally expensive pseudoinverse operation in the decoder is replaced by a computationally simple transpose operation. The number of steps is orders of magnitude smaller (e.g., S=2-60) than the number of steps conventionally required to reach convergence in an $l_1$-minimization decoder. By finding a data-driven matrix A, the system is able to reduce the size (i.e., number of dimensions) of the encoded vector while maintaining the same reconstruction error as conventional encoders, which enables computing systems to use less memory and achieve the same results. In other words, if the encoded vectors have k positions (k<d), the proposed system will have a k that is smaller than the k of conventional linear encoders but will have the same reconstruction error. When the number of dimensions in the encoded vector remains the same as conventional linear encoding, implementations reduce the reconstruction error, making the encoded vectors more accurate. In other words, if the present system has the same number of encoded dimensions as the conventional encoder (e.g., each has k positions) then the reconstruction error of the present encoder will be lower than that of conventional encoders, making the data more accurate.

In some implementations, a sparse dataset can be provided from a requestor, for which the system learns the data-driven encoding matrix A. The system may then provide the matrix A to the requestor. In some implementations, a sparse dataset can be provided from a requestor, for which the system learns the data driven encoding matrix A. The system may then use the matrix A to encode the vectors in the sparse dataset and return the encoded data to the requestor. Many data operations can be performed on the encoded data without having to decode the data. In some implementations both the learned matrix and the encoded data may be provided to the requestor. As used herein, providing a data set or encoded data includes providing a location to the data (e.g., a file name) or providing the data (e.g., the file) itself.

In one aspect, a computer program product embodied on a computer-readable storage device includes instructions that, when executed by at least one processor formed in a substrate, cause a computing device to perform any of the disclosed methods, operations, or processes disclosed herein.

One or more of the implementations of the subject matter described herein can be implemented so as to realize one or more of the following advantages. As one example, implementations provide a data-driven encoder that operates with fewer measurements than previous data-driven methods, which enables the system to scale to large, sparse datasets. For example, while prior data-driven methods such as Principal Components Analysis, or PCA, work for dense datasets, the mean squared error for sparse datasets can be poor, making results less accurate. In contrast, disclosed implementations achieve exact recovery (e.g., $10^{10}$ accuracy). In addition, implementations have a training time of O(nkd), where k is the number of dimensions in the compressed dataset and n is the number of training examples. In some implementations, k is 2-3 times smaller than d. In some implementations, k is proportional to the average number of nonzeros in the sparse vectors. For example, in a sparse dataset where d is $10^5$, k may be reduced to $10^2$. As another example, implementations provide a simplified non-linear decoder that executes faster than conventional $l_1$-minimization decoders (e.g., such as PCA) and but approximates the reconstruction error of the conventional $l_1$-minimization decoder within an additive error. The simplified non-linear decoder disclosed herein may replace an expensive pseudoinverse operation with a simpler, faster-executing identity matrix operation. Thus implementations reduce the processing cycles consumed by a conventional $l_1$-minimization decoder.

As another example, learning the data-driven matrix A for sparse datasets improves the recovery performance of $l_1$-minimization. For example, compared to Gaussian matrices, implementations can compress the original vector to a lower dimensionality by a factor of 2-3 times while still being able to recover the original vectors from the measurements within an error of $10^{10}$ (which is considered exact recovery). Thus, implementations improve use of physical memory resources without sacrificing quality. As another example, implementations use a small, fixed number of steps in a projected subgradient decoder, rather than processing until convergence. This reduces the expenditure of computing resources and decreases processing time for the projected subgradient decoder.

The details of one or more implementations are set forth in the accompanying drawings and the description below. Other features will be apparent from the description and drawings, and from the claims.

SUMMARY

Like reference symbols in the various drawings indicate like elements.

DETAILED DESCRIPTION

Figure 1:
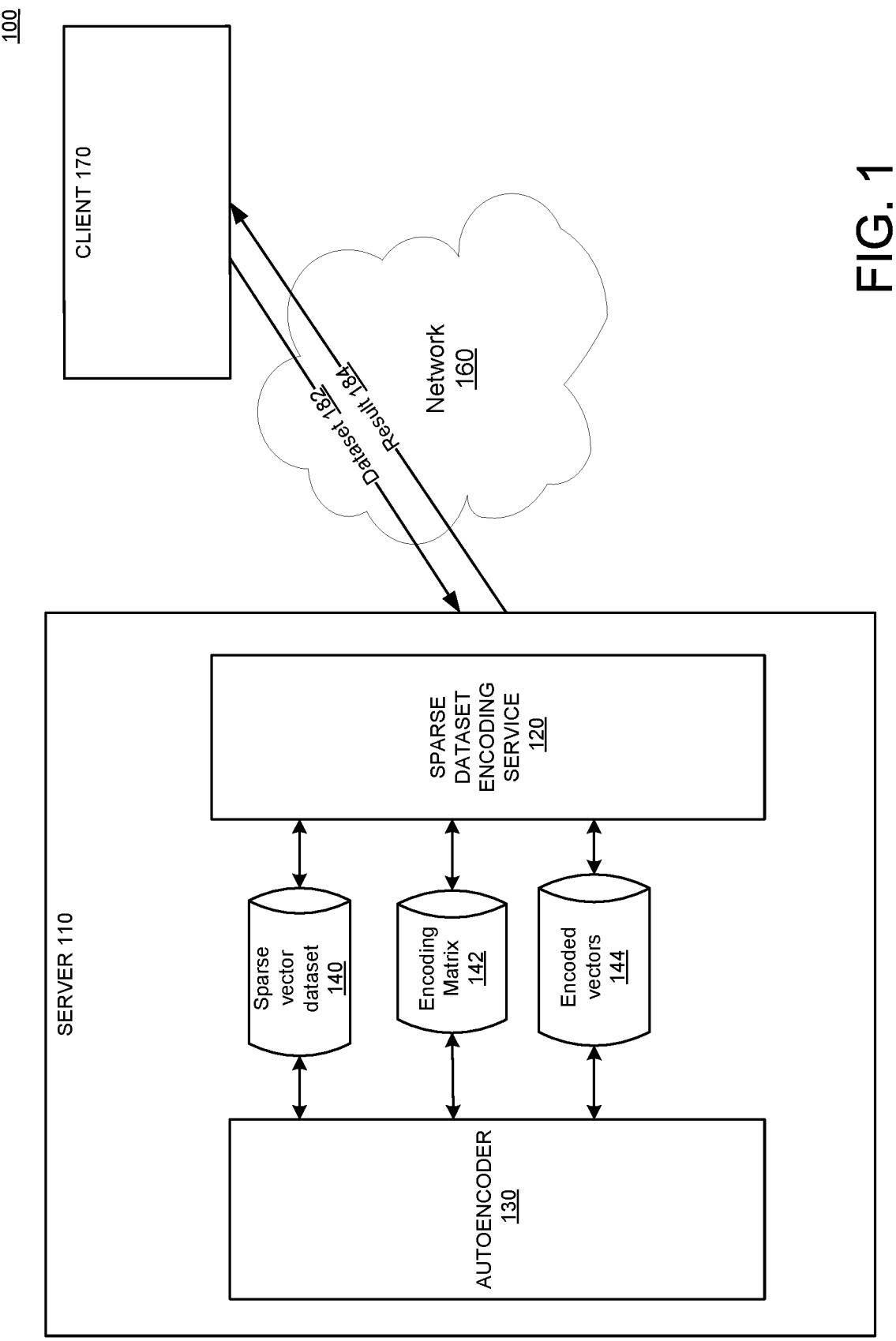
FIG. 1 illustrates an example system in accordance with the disclosed subject matter.

FIG. 1 is a block diagram of a sparse autoencoder system in accordance with an example implementation. The system 100 may be used to more efficiently and effectively encode a sparse dataset. The depiction of system 100 in FIG. 1 is described as a server-based system. However, other configurations and applications may be used. For example, some operations may be performed on a client device. Furthermore, while the system 100 may be described in terms of a search or recommendation system, the methods and techniques of disclosed implementations can be used in any system that uses sparse data set, such as classifications performed in the last layer of neural networks with a large number (e.g., millions) of output nodes, providing recommendations, finding similar items in a massive database, extreme classification where the label set is in the order of millions or even billions, any nearest neighbor task, etc.

Figure 8:
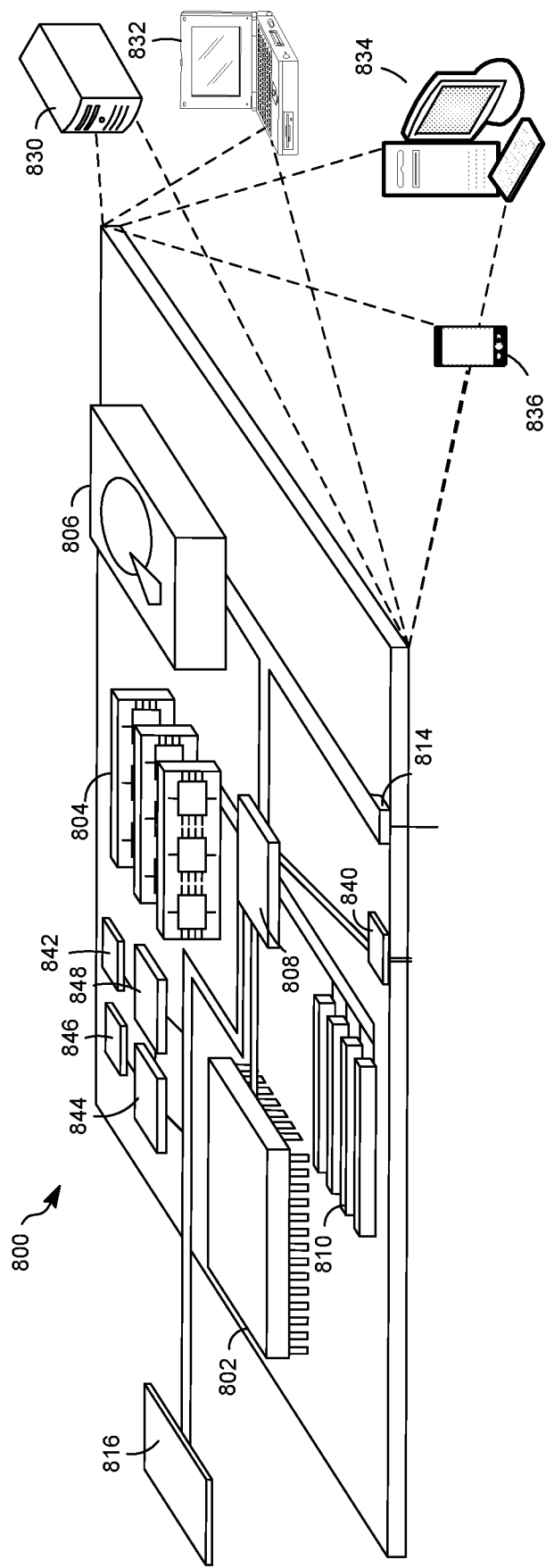
FIG. 8 shows an example of a computer device that can be used to implement the described techniques.
Figure 9:
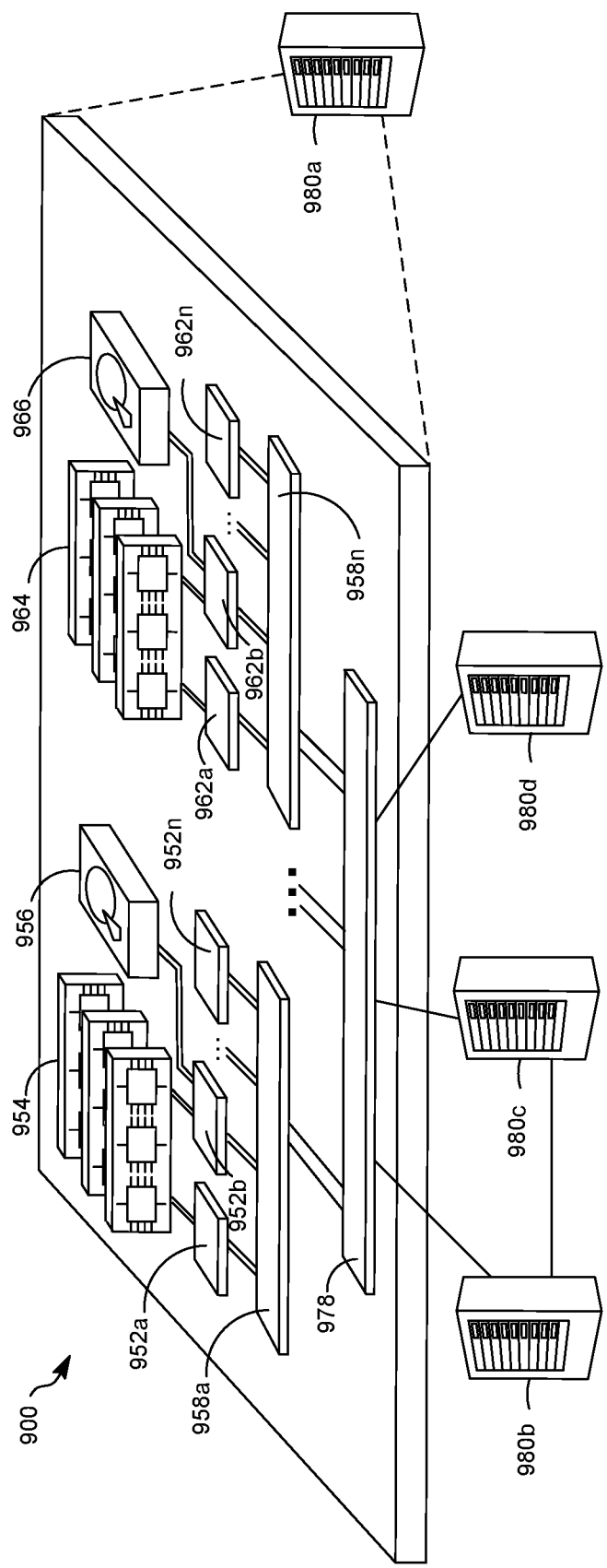
FIG. 9 shows an example of a distributed computer device that can be used to implement the described techniques.

The sparse autoencoder system 100 may be a computing device or devices that take the form of a number of different devices, for example a standard server, a group of such servers, or a rack server system, such as server 110. In addition, system 100 may be implemented in a personal computer, for example a laptop computer. The server 110 may be an example of computer device 800, as depicted in FIG. 8 or computer device 900, as depicted in FIG. 9.

Although not shown in FIG. 1, the server 110 can include one or more processors formed in a substrate and configured to execute one or more machine executable instructions or pieces of software, firmware, or a combination thereof. The processors can be semiconductor-based—that is, the processors can include semiconductor material that can perform digital logic. The processors may also include registers capable of performing data-level parallelism, e.g., single-instruction multiple-data (SIMD) processors using multiple registers. The processors may include graphics processors (GPUs). The processors may include embedded processors. The processors may include specialized processing units, e.g., tensors processing units. The server 110 can also include an operating system and one or more computer memories, for example a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, register memory, or a combination thereof, and store modules that, when executed by the one or more processors, perform certain operations. In some implementations, the modules may be stored in an external storage device and loaded into the memory of server 110.

The modules may include an autoencoder 130 and a sparse dataset encoding service 120. The sparse dataset encoding service 120 may receive a sparse dataset 182 from a requestor. In some implementations, the sparse dataset encoding service may store the sparse dataset, e.g., as sparse vector dataset 140. In some implementations, the sparse vector dataset 140 may be stored at another computing device and be accessible to the sparse dataset encoding service 120, e.g., via network 160. A vector can be thought of as an array of numbers, often floating point numbers, where each array position corresponds to a different attribute. For example, a vector may represent possible attributes of a movie, with each array position representing a different possible attribute. The attributes can represent various actors, directors, set locations, budget, box office sales, etc. There may be thousands of such attributes, but each movie will only have a handful of these attributes active, or in other words with nonzero values for the attributes. As another example, a vector may represent a document in a document repository and each array position a possible word, with array positions for words actually appearing in the document having a non-zero value. Thus, a sparse dataset is a dataset where a majority of the array positions have zero values. In sparse datasets, it is common for less than 10% of the vector positions to have nonzero values. The sparse vector dataset 140 may include many such records, e.g., thousands or even millions.

The sparse dataset encoding service 120 uses autoencoder 130 to learn an encoding matrix A optimized for the received data (e.g., sparse vector dataset 140). The optimized encoding matrix A is stored, e.g., as encoding matrix 142. An encoding matrix projects an original vector $x \in \mathbb{R}^d$ into a compressed vector y with fewer dimensions k (k<d) in a way that allows recovery of the original vector x. Reconstruction error is a measurement of the differences between the original vector x and the vector recovered from its respective encoded vector y. The compressed vector y is also referred to as an encoded vector or an embedding of x. In some implementations the sparse dataset encoding service 120 stores the embeddings, e.g., as encoded vectors 144. Ideally, y=Ax allows exact (or near-exact) recovery of the original vector x from its embedding y. A is a matrix of dimension kxd, or in other words, $A \in \mathbb{R}_{k \times d}$. For each vector x in the sparse vector dataset 140, the encoding matrix A will produce an encoded vector y according to y=Ax. Conventional systems have used a randomly generated matrix A, but this randomly generated matrix requires many data points (e.g., a higher k) to achieve acceptable reconstruction error. Implementations learn a data driven matrix A, which reduces the number of data points in the embeddings but provides the same reconstruction error or reduces the reconstruction error with the same number of data points. In other words, disclosed implementations learn a much efficient/compressed representation (e.g., a smaller k) and still achieve exact reconstruction. In contrast, previous methods either cannot exactly recover the data (e.g., PCA, standard autoencoders) or require a larger k for exact reconstruction (e.g., random Gaussian matrices).

The sparse dataset encoding service 120 uses the autoencoder 130 to learn the encoding matrix A. The autoencoder 130 is a computational model, such as a neural network or linear model, configured to initialize an encoding matrix A, e.g., encoding matrix 142. In some implementations, the autoencoder 130 includes one or more network layers. The autoencoder 130 includes a linear encoder and a simplified non-linear decoder. The autoencoder 130 uses the encoder and decoder to learn the encoding matrix A. For example, during the training phase (e.g., learning the encoding matrix A), the encoder applies the encoding matrix A to a subset of the sparse vector dataset 140. The encoder may start with a random encoding matrix A, e.g., initialized by the sparse dataset encoding service 120. For example, the initial encoding matrix A may be populated with a Gaussian distribution. Applying the encoding matrix A to the subset of vectors provides an encoded dataset. The decoder of the autoencoder 130 then decodes the encoded dataset using a projected subgradient update with a limited number S of steps, e.g. less than 10. In some implementations the decoder may simulate a projective subgradient expressed as $x^{(t+1)} = x^{(t)} - \alpha_t(I - A^\dagger A)\,\text{sign}(x^{(t)})$, where $A^\dagger$ is the Moore-Penrose inverse matrix of A ($A^T(AA^T)^{-1}$), $a_t$ is a scalar variable learned from the data and t is the current round of training, e.g., t={1, 2, ..., S}. Limiting the number of rounds (e.g., S≤10) makes the decoder portion of the autoencoder 130 fast. A technical difficulty in using projective subgradient decoders in neural networks involves back-propagating the pseudoinverse (i.e., $A^\dagger$ above), which is computationally complex and time-consuming. Implementations solve this technical difficulty by replacing this computationally expensive permutation operation in the projective subgradient with a much less complex transpose operation. Thus, in some implementations the projected subgradient used by the decoder of the autoencoder 130 may be expressed as $x^{(t+1)} = x^{(t)} - \alpha_t(I - A^T A)\,\text{sign}(x^{(t)})$. In some implementations, $\alpha_t$ may be regularized to have the form $\alpha_t = \beta/t$, for t∈{1, 2 ... S}, where S is the total number of steps, or rounds, performed.

Figure 2:
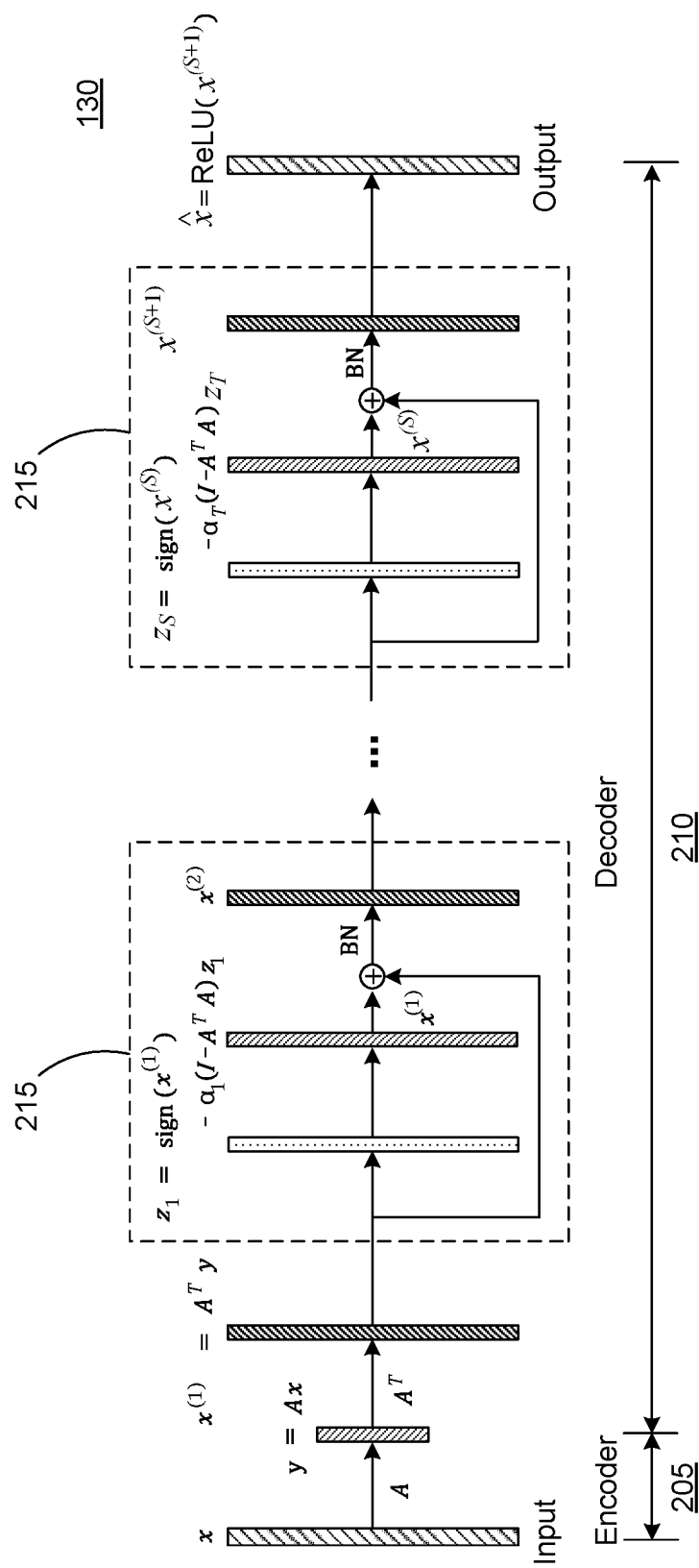
FIG. 2 illustrates a block diagram of a neural network for learning the matrix A for a sparse dataset, in accordance with disclosed subject matter.

FIG. 2 illustrates a block diagram of an example neural network used in the autoencoder 130, according to an implementation. The neural network of FIG. 2 includes a simple linear encoder 205. The linear encoder 205 encodes an incoming vector x as y=Ax, where A is the embedding matrix learned from the data. Initially, the system may initialize the embedding matrix A as a random matrix. For example, in some implementations the matrix A is initially generated by a truncated normal distribution. In some implementations, the truncated normal distribution may have a standard deviation of $1/\sqrt{d}$, where d is the number of dimensions in the sparse dataset to be encoded.

After encoding, the decoder 210 is used to recover the vector from its embedding y. The recovered vector may be denoted as $\hat{x}$. The decoder 210 is a neural network that includes S blocks 215, also referred to as steps. S is a tuning parameter and is an integer greater than 1. In some implementations S can be two to five. In some implementations S can be 10. In some implementations S can be 60 or less. The value of S is a tradeoff between training time and accuracy. In general, S is at least orders of magnitude smaller than the number of steps conventionally required to reach convergence in an $l_1$-minimization decoder. In the example decoder 210 of FIG. 2, the blocks 215 are connected in a feedforward manner. In other words, the output vector of the $t^{th}$ block is the input vector to the (t+1) block. The structure of each block 215 may be identical. In some implementations, each block 215 includes two network layers and one residual connection. In some implementations, the first layer takes $x^{(t)}$ as input and computes $\text{sign}(x^{(t)})$. The second layer multiplies $\text{sign}(x^{(t)})$ by a low-rank weight matrix $-\alpha_t(I - A^T A)$, where I is the identity matrix, and $A^T$ is the transpose of matrix A. This low-rank weight matrix has a strong structure that reduces the computational complexity compared with a vanilla fully connected layer where the matrix has no constraints. In sparse datasets where d is very large, using a d×d matrix with no constraints is undesirable due to high computational complexity.

The residual connection of each block 215 of the decoder 210 adds the input vector $x^{(t)}$ to the result of the multiplication to obtain the output $x^{(t+1)}$. The example decoder 210 of FIG. 2 includes a standard batch normalization (BN) layer inside each block 215 before outputting the final vector. Adding the BN layer may speed up the training process, but use of the BN layer is optional. Where the sparse dataset includes nonnegative sparse vectors, the decoder 210 may also include rectified linear units (ReLU) in the last output layer to obtain the final output, as illustrated in FIG. 2. As indicated above, $\alpha_1, \alpha_2, \ldots \alpha_S$, are scalar variables to be learned from the data, e.g., from sparse vector dataset 140. The system may regularize $\alpha_t$ to β/t, where β is the only scalar variable to be learned from the data. In some implementations, β is initialized to 1.0. During training, the autoencoder 130 minimizes the average squared $l_2$ reconstruction error between x and $\hat{x}$, where $\hat{x}$ is the output of the decoder 210, i.e., the recovered vector. In some implementations, the autoencoder 130 uses stochastic gradient descent (SGD) for optimization. The SGD may have a learning rate that is a tuning parameter. The number of embedding dimensions (e.g., k) is also a tuning parameter, as is the value of S (the number of blocks). In some implementations some or all of the tuning parameters may be provided by the requesting process. In some implementations, the sparse dataset encoding service 120 may provide some or all of the tuning parameters, or provide default values for the tuning parameters, which can be overridden by a requesting process.

In a training mode, the sparse dataset encoding service 120 provides the autoencoder 130 with some number n of the vectors from sparse vector dataset 140. The value of n can also be a tuning parameter. These vectors may be sampled from sparse vector dataset 140. The sparse dataset encoding service 120 initializes the parameters, e.g., initializing the matrix A and the learned scalar variables (e.g., β or $\alpha_1$). During training, the objective of the autoencoder 130 is to minimize the average squared $l_2$ reconstruction error between x and x̂. The minimization of the reconstruction error may be expressed as $$\min_{A \in R^{k \times d}, \beta \in R} \frac{1}{n} \sum_{i=1}^{n} \|x_i - \hat{x}_i\|_2^2.$$

More specifically, the autoencoder 130 determines the error between the reconstructed vector and the original vector and back-propagates this error to make adjustments in the matrix A, so that the error from decoding decreases round after round of training. In each round, the autoencoder 130 encodes the original vectors to generate embeddings and decodes the embeddings to generate reconstructed vectors. The training may continue until convergence or after a predetermined number of rounds.

Figure 7:
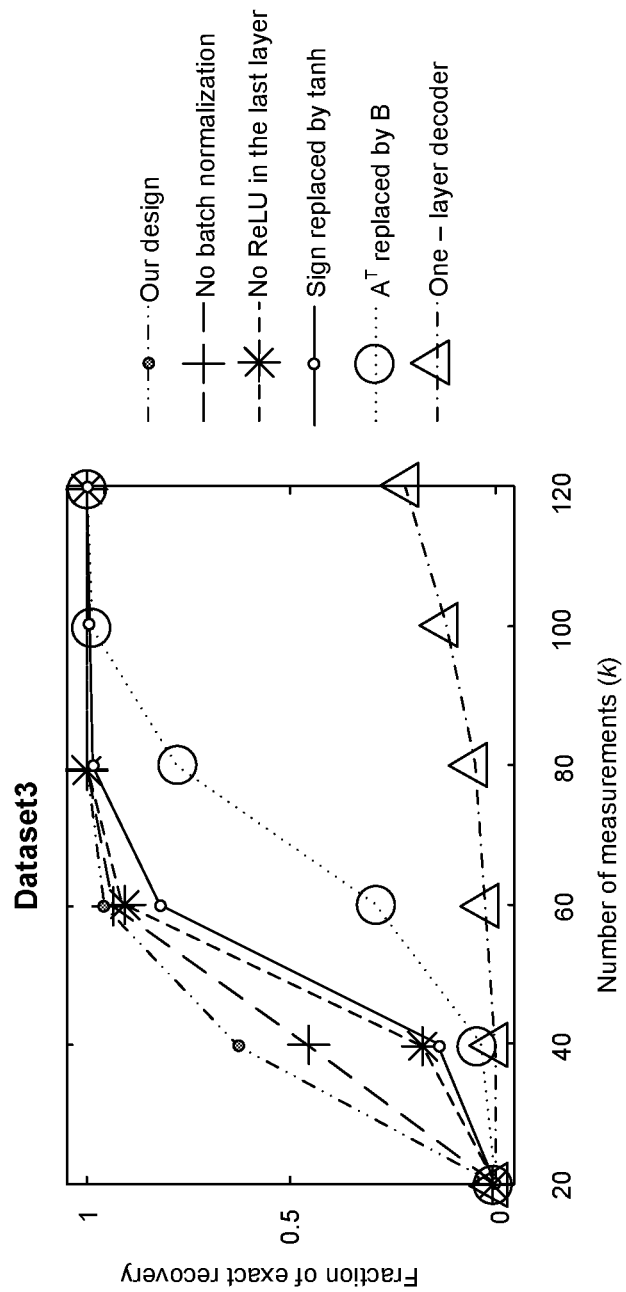
FIG. 7 illustrates a graph comparing the tradeoff between encoded vector size and recall using different elements of various implementations.

The architecture of the autoencoder 130 of FIG. 2 is one example and implementations include other configurations. For example, In some implementations, the first layer may compute tan $h(x^{(t)})$ rather than $sign(x^{(t)})$ and the second layer may multiply the tan $h(x^{(t)})$ by the low-rank weight matrix. In some implementations, the transpose of matrix A in the low-rank weight matrix may be replaced by an arbitrary matrix learned from the data. In some implementations the decoder may use one layer, e.g., x̂=ReLU($A^S y$). Such an implementation corresponds to the simple case of S=0, but does not perform as well (worse recovery error) as the decoder 210 of FIG. 2. FIG. 7 illustrates the performance differences resulting from various configurations of disclosed implementations.

Returning to FIG. 1, once training has completed, the sparse dataset encoding service 120 may store the encoding matrix A determined by the training, e.g., as encoding matrix 142. In some implementations, the sparse dataset encoding service 120 may provide the encoding matrix 142 as the result 184 to the requesting client 170. The requesting client 170 may use the encoding matrix 142 to encode additional vectors. In some implementations, the sparse dataset encoding service 120 may use the encoding matrix 142 to encode the vectors in the sparse vector dataset 140 as encoded vectors 144. In other words, for each vector x in the sparse vector dataset 140, the sparse dataset encoding service 120 may generate a respective encoded vector y by applying the encoding matrix 142, i.e., y=Ax. In some implementations, the sparse dataset encoding service 120 may provide the encoded vectors 144 as result 184 to requesting client 170. The encoded vectors 144 can be used in some problems in place of the original vectors, so decoding is unnecessary. In some implementations, the result 184 may include the encoding matrix 142 and the encoded vectors 144. In some implementations the encoded vectors 144 may be stored remotely from the server 110.

The sparse autoencoder system 100 may be in communication with client(s) 170 over network 160. Clients 170 may allow a user to provide a dataset 182 to the sparse dataset encoding service 120 and to receive result 184, which includes an encoding matrix optimized for the dataset 182, encoded vectors 144 generated using the encoding matrix optimized for the dataset 182, or both the encoding matrix and the encoded vectors. In some implementations, the dataset 182 is a sample of data, e.g., represents vectors to be used in training the autoencoder 130 and generating the encoding matrix 142. In some implementations, the dataset 182 is a location of a dataset, e.g., so that server 110 can access the dataset at a remote computing device. In some implementations, the result 184 includes a location of the matrix and/or the location of encoded vectors. Network 160 may be for example, the Internet or the network 160 can be a wired or wireless local area network (LAN), wide area network (WAN), etc., implemented using, for example, gateway devices, bridges, switches, and/or so forth. Via the network 160, the sparse autoencoder system 100 may communicate with and transmit data to/from clients 170. In some implementations, the client 170 may be another server or distributed computing system. Client 170 may be another example of computing device 800 or computing device 900.

Sparse autoencoder system 100 of FIG. 1 represents one example configuration and other configurations are possible. In addition, components of system 100 may be combined or distributed in a manner differently than illustrated. For example, in some implementations one or more of the sparse dataset encoding service 120 and the autoencoder 130 may be combined into a single module or engine. In addition, components or features of the sparse dataset encoding service 120 or the autoencoder 130 may be distributed between two or more modules or engines, or even distributed across multiple computing devices. For example, sparse vector dataset 140, the encoding matrix 142, and/or encoded vectors 144 may be distributed across multiple computing devices and/or may be remote from but accessible to server 110. In some implementations one or more of the sparse vector dataset 140, the encoding matrix 142, and the encoded vectors 144 may be stored at client 170. As another example, the requesting process may be local to the server 110.

Figure 3:
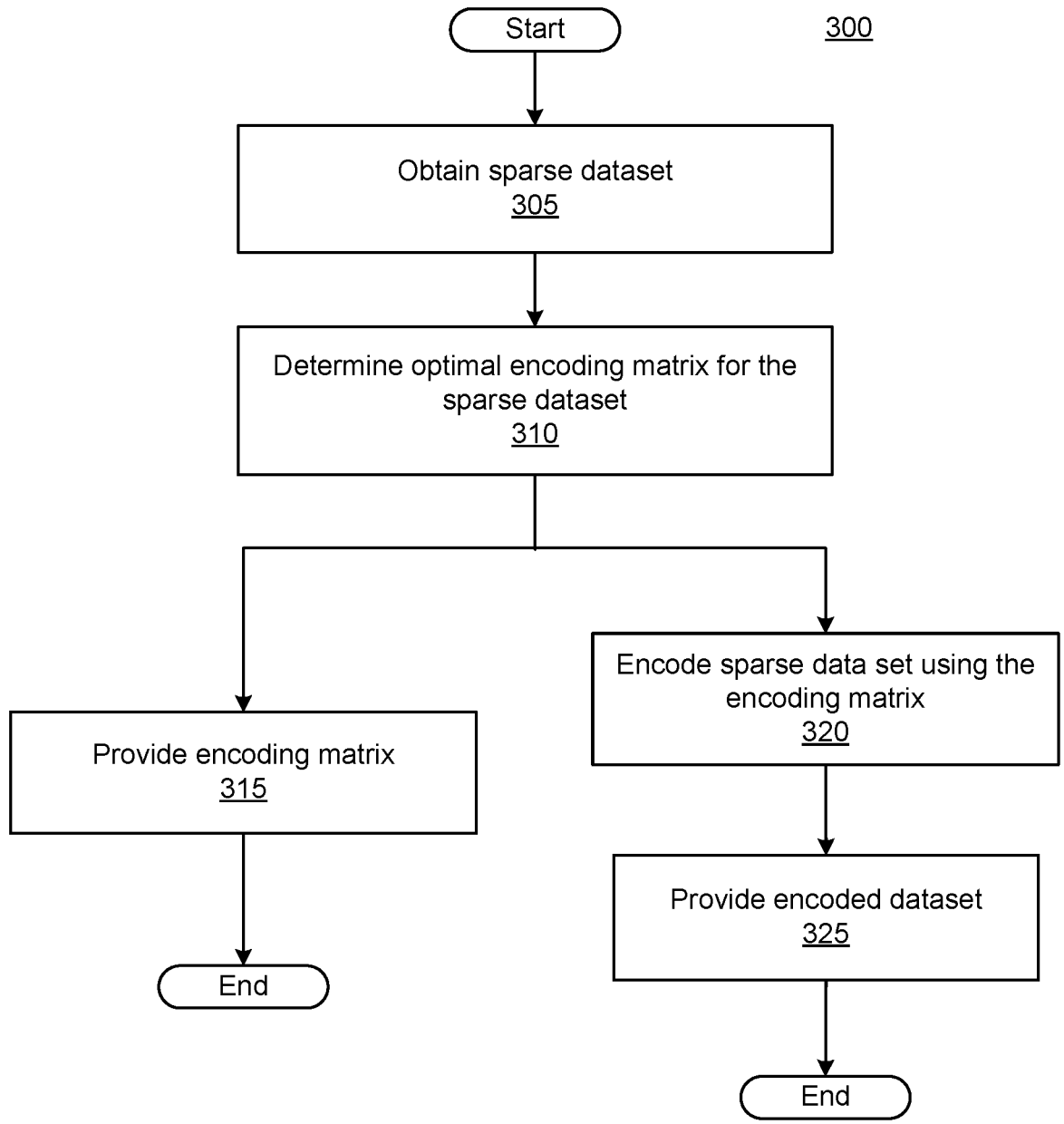
FIG. 3 illustrates a flow diagram of an example process for providing efficiently encoded sparse data using a data-driven matrix A, in accordance with disclosed subject matter.

FIG. 3 illustrates a flow diagram of an example process 300 for providing efficiently encoded sparse data using a data-driven matrix A, in accordance with disclosed subject matter. Process 300 may be performed by a sparse autoencoder system, such as system 100 of FIG. 1. Process 300 is an example of an efficient and accurate data-driven autoencoding process for sparse datasets. Process 300 may be performed in response to receiving a request from a requesting process.

Process 300 may begin with the sparse autoencoder system obtaining a sparse dataset (305). The sparse dataset is a dataset of sparse vectors, e.g., vectors with high dimensionality but comparatively few dimensions with non-zero values. The dataset may have an underlying, but a priori unknown structure, which the autoencoder identifies and uses to decrease reconstruction error and/or decrease embedding size. Obtaining the sparse dataset may include receiving a location of the dataset. In some implementations, the sparse dataset may represent a subset of records from a sparse dataset. In some implementations, the system may also receive one or more tuning parameters from the requesting process. The tuning parameters include the number of dimensions (k) in the encoded vector, the number of steps (5) used in the decoder to learn the data-driven matrix, a subgradient descent learning rate, etc. In some implementations, the system may determine or select one or more of the tuning parameters. In some implementations, the system may provide default values for one or more tuning parameters that can be overridden by the requesting process.

Figure 6:
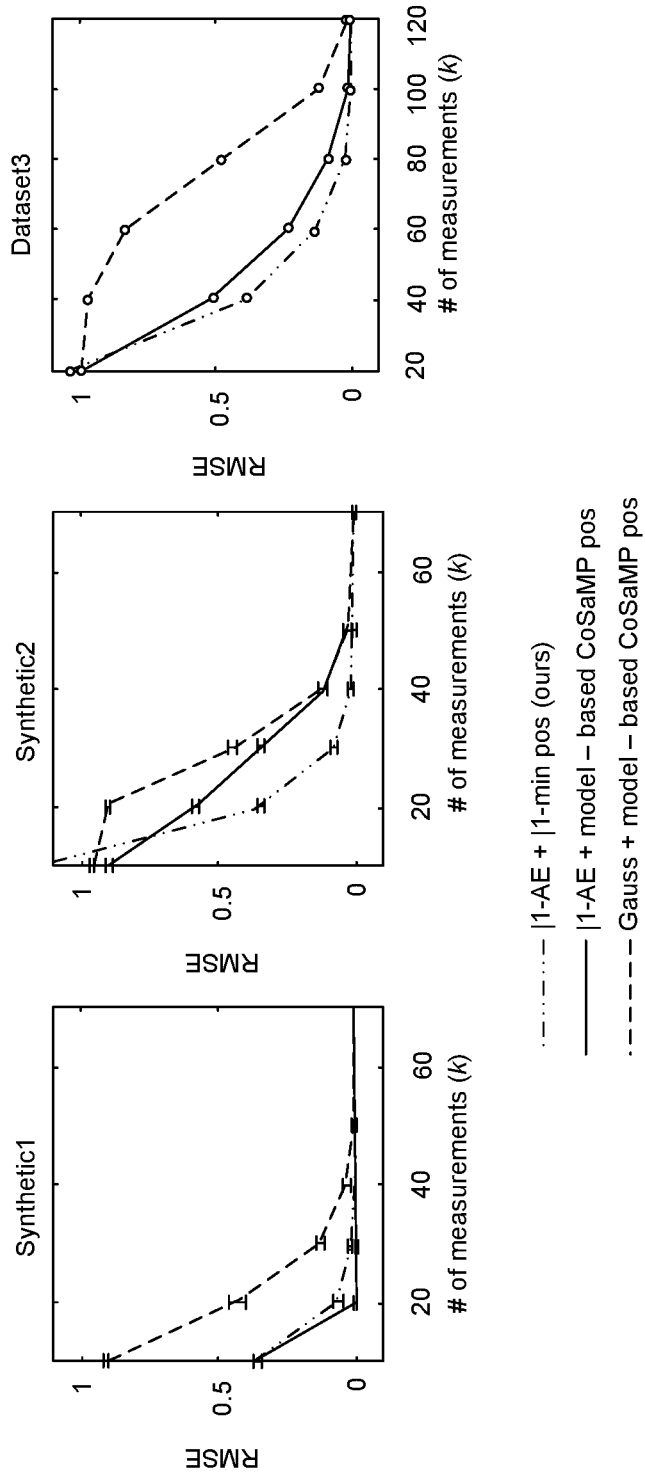

The system may determine, or learn, a data driven encoding matrix for the sparse data set (310). The matrix is optimized for the dataset obtained in step 305. Thus the matrix is also referred to as data-driven. The data-driven matrix is learned via an autoencoder that uses a linear encoder and a non-linear decoder using a limited quantity of projected subgradient steps, as explained in more detail with regard to FIGS. 2 and 4. The system may provide the data-driven encoding matrix to the requesting process (315). In such implementations, the requesting process may use the data-driven encoding matrix for encoding and/or decoding data. In some implementations, the system may use the data-driven encoding matrix to generate encoded vectors from the sparse dataset (320). For example, the system may apply the data-driven encoding matrix to each vector in the sparse dataset to generate a respective encoded vector. The system may provide the encoded vectors to the requesting process (325). Providing the encoded vectors may include providing the vectors themselves or providing a location for the encoded vectors. In some implementations the data-driven encoding matrix may be provided with the encoded vectors. Process 300 then ends for that particular sparse dataset. Process 300 may be run concurrently for several different source sparse datasets. The requesting process can decode the embeddings using a conventional $l_1$-minimization decoder, a decoder similar to that described herein (e.g., decoder 210), or other data-dependent decoders. FIG. 6 illustrates example performance resulting from uses of various decoders with disclosed implementations.

Figure 4:
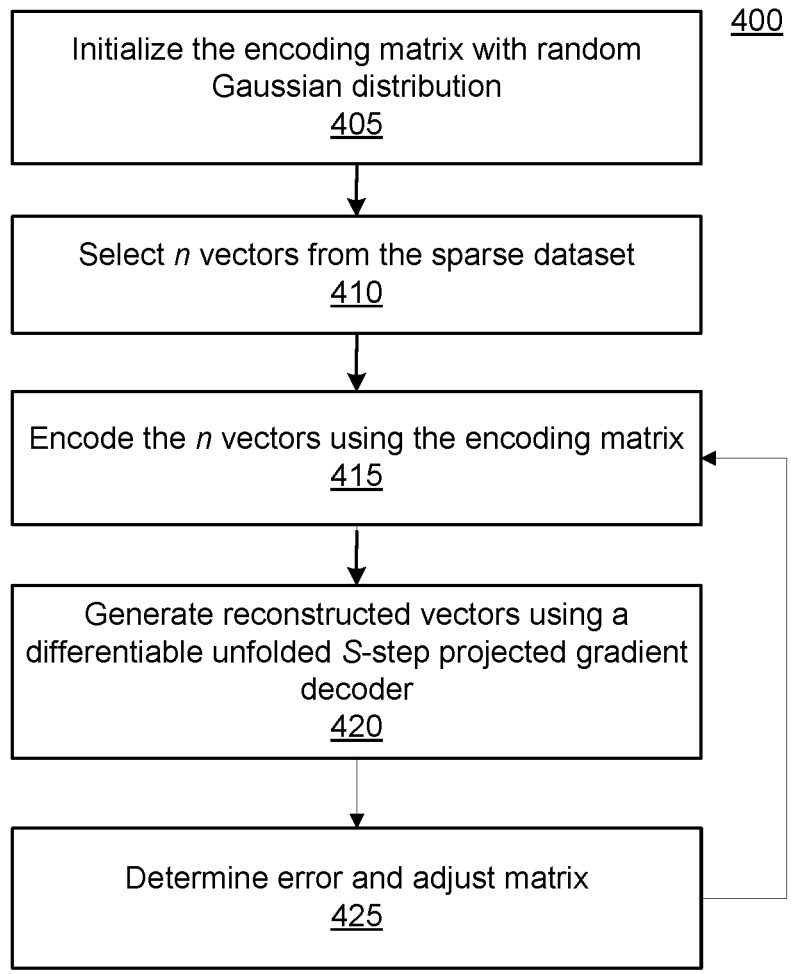
FIG. 4 illustrates a flow diagram of an example process for determining the data-driven matrix A for a given sparse dataset, according to an implementation.

FIG. 4 illustrates a flow diagram of an example process 400 for determining the data-driven matrix A for a given sparse dataset, according to an implementation. Process 400 may be performed by a sparse autoencoder system, such as system 100 of FIG. 1. Process 400 may be performed as part of step 310 of FIG. 3. In some implementations, process 400 may be performed using the autoencoder 130 of FIG. 2.

Process 400 may begin by initializing an encoding matrix with a random distribution (405). In some implementations, the random distribution may be a Gaussian distribution. For example, the system may generate a random matrix by a truncated normal distribution with a standard deviation of $1/\sqrt{d}$, where d is the number of dimensions in the vectors of the sparse dataset. In some implementations, the system may also initialize a scalar variable learned by the autoencoder. The system may select n vectors from the sparse dataset to use for learning the data-driven encoding matrix A (410). The value of n may be a tuning parameter selected by a requesting process. The value of n may be selected by the system. The value of n is an integer and represents a tradeoff between training time and quality. For example, lower n (only a few training examples) results in faster training, but higher reconstruction error. Higher n requires longer training times, but results in better (lower) reconstruction error. In some implementations, the training examples may be selected at random from the sparse dataset. In some implementations, the training examples may be all the vectors in the sparse dataset. In such implementations the requesting process may or may not have provided a full dataset. In other words, the requesting process may have provided a sample of vectors from a full dataset.

The system may perform a training loop to find, or in other words learn, the data-driven encoding matrix A using a projected subgradient method of solving an $l_1$-norm minimization problem. For example, the system may first encode the training data using the matrix $A \in \mathbb{R}^{k \times d}$ (415), where k is the number of dimensions in the embedding. The value of k is a tuning parameter. In some implementations, the value of k is at least half of d. In some implementations, the value of k is proportional to the average sparsity of the sparse vectors, or in other words, the average number of nonzeros across the vectors in the database. The encoder is a simple linear encoder that generates an embedding y for each sparse vector x according to y=Ax. The system may decode the embeddings (e.g., each y) using a projected subgradient method (420) to generate reconstructed vectors, e.g., one reconstructed vector $\hat{x}$ for each embedding y. In some implementations, the system uses a fixed number of steps in the projected subgradient method. The number of steps, S, is a tuning parameter. In some implementations the system selects the number of steps. In some implementations, the requesting process selects the number of steps. S is small when compared to the number of steps used in conventional $l_1$-norm minimization solutions, e.g., running until convergence. In some implementations S is not fixed and the decoder runs to convergence (e.g., S is very large). However, such implementations can result in lower reconstruction error and longer training times. The system determines a reconstruction error (e.g., the difference between a vector x and its corresponding reconstructed vector and adjusts the matrix A to minimize the error (425). In some implementations, the projected subgradient decoder, represented by steps 420 and 425, may be expressed as $x^{(x+1)}=x^{(t)}-a_t(I-A^TA)$ sign$(x^{(t)})$ where $t \in \{1, 2, \ldots S\}$. In some implementations, the projected subgradient decoder may be expressed as $x^{(x-1)}=x^{(t)}-a_t(I-A^TA)$ tan $h(x^{(t)})$. In some implementations, rather than using the transpose ($A^T$) the system may use an arbitrary matrix $B \in \mathbb{R}^{d \times k}$. The arbitrary matrix may be learned from the data. Process 400 ends when the data driven matrix A has been identified, e.g., when reconstruction error is minimized (convergence) or after a specified number of training rounds.

Figure 5:
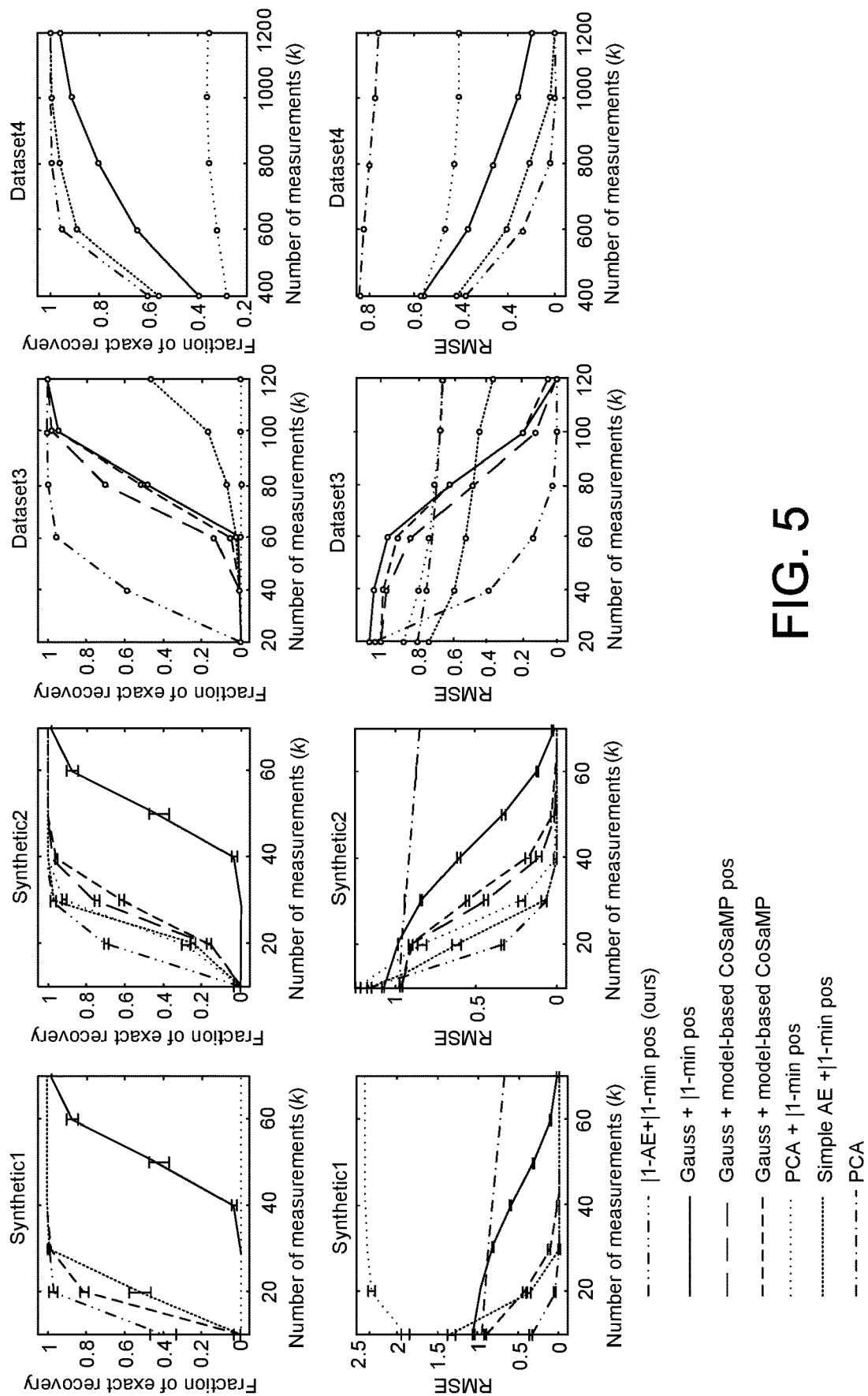
FIGS. 5 and 6 illustrate graphs showing example comparisons of encoded vector size and recall for various conventional sparse-encoding methods compared with example implementations.

FIGS. 5-7 illustrate graphs showing example comparisons of recall and measurements (embedding size) for conventional sparse-encoding methods and example implementations on various sparse datasets. In the graphs of FIGS. 5-7, various datasets are encoded and then decoded using conventional techniques and various implementations. In the graphs of FIGS. 5-7, Synthetic1 and Synthetic2 are randomly generated datasets according to the block sparsity model. Synthetic1 is a 1-block sparse with block size of 10, Synthetic2 is 2-block sparse with block size of 5. The graphs for Synthetic1 and Synthetic2 illustrate the mean and standard deviation (indicated by the error bars) across 10 randomly generated datasets. Dataset3 models a real-world dataset and is a one-hot encoded categorical dataset with 15626 dimensions. Dataset4 is a real-world text dataset with 47,236 TF-IDF features. For training, every sample (from Synthetic1, Synthetic2, Dataset3, and Dataset4) is normalized to have unit $l_2$ norm and SGD is used for training.

In the graphs of FIGS. 5-6, $l_1$_AE+$l_1$-min pos represents a disclosed implementation that finds the data-driven matrix A using an encoder and decoder similar to FIG. 2 and uses this data-driven matrix as the measurement matrix. To decode the embeddings, the decoder that solves the following optimization problem $\min_{x \in \mathbb{R}^d} \|x\|_1$ s.t. Ax=y, x≥0. All autoencoders mentioned below with "+$l_1$-min pos" use a decoder that solves this optimization problem. Gauss+ model-based CoSaMP generates a random Gaussian matrix $G \in \mathbb{R}^{k \times d}$ with i.i.d. $\mathcal{N}(0,1/k)$ entries as the measurement matrix using the standard mode-based CoSaMP algorithm as the recovery algorithm. Gauss+model-based CoSaMP pos is similar to the previous method, except that a positivity constraint is added to the original model-based CoSaMP algorithm. This modified method always outputs nonnegative vectors. Gauss+$l_1$-min pos uses a random Gaussian matrix $G \in \mathbb{R}^{k \times d}$ with i.i.d. $\mathcal{N}(0,1/k)$ entries as the measurement matrix and the decoder mentioned above. PCA+$l_1$-min pos performs truncated singular value decomposition (SVD) on the training set, and uses the top singular vectors as the measurement matrix. The decoder is described above. Simple AE+$l_1$-min pos is an implementation that trains a simple autoencoder (for an input vector x, the output is given as ReLU($B^T Ax$)∈$\mathbb{R}^d$ where both B ∈ $\mathbb{R}^{k \times d}$ and A∈$\mathbb{R}^{k \times d}$ are learned from data) and the decoder is described above. PCA uses truncated SVD on the training set (supposing A∈$\mathbb{R}^{k \times d}$ is top-k singular vectors, every vector x in the test set is estimated by $A^T$ Ax). All encoding methods use a two-step encoding+decoding process which linearly transforms the input vector x into y=Ax and the decoder decodes y to get a reconstructed vector $\hat{x}$.

FIG. 5 illustrates recovery performance of these various encoding methods. The top set of graphs illustrate the fraction of exactly recovered test samples. A vector x is exactly recovered if it produces a reconstructed vector $\hat{x}$ that satisfies $\|x-\hat{x}\|_2 \leq 10^{-10}$. As illustrated, disclosed implementations outperform all other methods, able to compress the input vectors into smaller dimensional space (smaller k) with the same or better recovery. The second metric is the root mean-squared error (RMSE) over the test datasets. The lower the error, the better the performance. As illustrated by the bottom set of graphs, implementations have lower mean-squared error than other methods, especially with fewer data points. Dataset3 illustrates that implementations using the simple autoencoder are not as efficient, but still perform well. FIG. 6 is a graph that illustrates the data-driven matrix A learned by disclosed implementations also works with the model-based CoSaMP decoder, and still performs better than a random matrix.

FIG. 7 illustrates a graph comparing the performance of various disclosed implementations on Dataset3. Some variations change the configuration of the decoder when learning the data-driven matrix A. For example, one implementation eliminates the batch normalization in each block. One implementation eliminates the ReLU in the last layer. One implementation replaces the sign function with a tan h function. One implementation replaces the transform matrix $A^T$ with a random matrix B. The last implementation is a one-layer, simple decoder, e.g., simple AE. FIG. 7 illustrates various tradeoffs between number of measurements and recall (fraction of exact recovery) in the various implementations.

Techniques disclosed herein can be used for any problem that involves sparse vectors. For example, implementations can be used to find products similar to each other, documents similar to each other, users similar to each other, etc. Implementations can also be used for data compression.

FIG. 8 shows an example of a generic computer device 800, which may be server 110, and/or client 170 of FIG. 1, which may be used with the techniques described here. Computing device 800 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 800 includes a processor 802, memory 804, a storage device 806, and expansion ports 810 connected via an interface 808. In some implementations, computing device 800 may include input/output interface 842, transceiver 846, communication interface 844, and a GPS (Global Positioning System) receiver module 848, among other components, connected via interface 808. Device 800 may communicate wirelessly through communication interface 844, which may include digital signal processing circuitry where necessary. Each of the components 802, 804, 806, 808, 810, 840, 842, 844, 846, and 848 may be mounted on a common motherboard or in other manners as appropriate.

The processor 802 can process instructions for execution within the computing device 800, including instructions stored in the memory 804 or on the storage device 806 to display graphical information for a GUI on an external input/output device, such as display 816. Display 816 may be a monitor or a flat touchscreen display. In some implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk. In some implementations, the memory 804 may include expansion memory provided through an expansion interface.

The storage device 806 is capable of providing mass storage for the computing device 800. In one implementation, the storage device 806 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 804, the storage device 806, or memory on processor 802.

The interface 808 may be a high speed controller that manages bandwidth-intensive operations for the computing device 800 or a low speed controller that manages lower bandwidth-intensive operations, or a combination of such controllers. An external interface 840 may be provided so as to enable near area communication of device 800 with other devices. In some implementations, controller 808 may be coupled to storage device 806 and expansion port 814. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may support a number of input and/or output devices via interface 842. For example, the computing device 800 may include a camera, a printer port, a display, a touch screen, speakers, a microphone, a sound jack, a light (e.g., flash), etc.

The computing device 800 may be implemented in a number of different forms, as shown in the figure. For example, it may be implemented as a standard server 830, or multiple times in a group of such servers. It may also be implemented as part of a rack server system. In addition, it may be implemented in a personal computer such as a laptop computer 822, or smart phone 836. An entire system may be made up of multiple computing devices 800 communicating with each other. Other configurations are possible.

FIG. 9 shows an example of a generic computer device 900, which may be server 110 of FIG. 1, which may be used with the techniques described here. Computing device 900 is intended to represent various example forms of large-scale data processing devices, such as servers, blade servers, datacenters, mainframes, and other large-scale computing devices. Computing device 900 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 900 may include any number of computing devices 980. Computing devices 980 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 980a includes multiple racks 958a-958n. Each rack may include one or more processors, such as processors 952a-952n and 962a-962n. The processors may include data processors, specialized processors, graphics processing units, network attached storage devices, and other computer controlled devices. In some implementations, one processor may operate as a master processor and control the scheduling and data distribution tasks. Processors may be interconnected through one or more rack switches 958, and one or more racks may be connected through switch 978. Switch 978 may handle communications between multiple connected computing devices 900.

Each rack may include memory, such as memory 954 and memory 964, and storage, such as 956 and 966. Storage 956 and 966 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 956 or 966 may be shared between multiple processors, multiple racks, or multiple computing devices and may include a computer-readable medium storing instructions executable by one or more of the processors. Memory 954 and 964 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 954 may also be shared between processors 952a-952n. Data structures, such as an index, may be stored, for example, across storage 956 and memory 954. Computing device 900 may include other components not shown, such as controllers, buses, input/output devices, communications modules, etc.

An entire system, such as system 100, may be made up of multiple computing devices 900 communicating with each other. For example, device 980a may communicate with devices 980b, 980c, and 980d, and these may collectively be known as system 100. As another example, system 100 of FIG. 1 may include one or more computing devices 900. Some of the computing devices may be located geographically close to each other, and others may be located geographically distant. The layout of system 900 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

According to one aspect, a computer-implemented method includes receiving, using at least one processor of a computing device, a dataset of sparse vectors from a requesting process, the vectors have a dimension of d, initializing an encoding matrix stored in a memory of the computing device, selecting a subset of sparse vectors from the dataset; and modifying, using the at least one processor, the encoding matrix via machine learning to minimize reconstruction error Modifying the encoding matrix may be accomplished by generating an encoded vector of dimension k for each vector in the subset using the encoding matrix, where k<d, decoding each of the encoded vectors using S projected subgradient steps, where S is a predetermined number that is much lower than the number of steps used for convergence, and using back propagation to adjust the encoding matrix. The method may also include generating an encoded dataset by encoding each vector in the dataset of sparse vectors using the encoding matrix and providing the encoded dataset to the requesting process.

These and other aspects may include one or more of the following features. For example, k may be proportional to an average of nonzero values in the vectors of the dataset and/or d may be at least ten thousand. As another example, each projected gradient descent step may substitute a transformation matrix for a pseudoinverse operation. As another example, the decoding is accomplished via a neural network including S steps connected in a feedforward manner, each step having an input and an output, wherein the input is $x^t$ and wherein the output ($x^{(t+1)}$) of each step is represented as $x^{(t)} - \alpha_t(I-A^TA)\text{sign}(x^t)$, where t is the $t^{th}$ step of the S steps and $\alpha_t$ is a scalar variable for step t learned from the subset. The sparse dataset may be nonnegative and the method may also include using rectified linear units in the last layer of the neural network. In some implementations, $\alpha_t=\beta/t$ where $\beta$ is learned from the subset. As another example, the decoding may be accomplished via a neural network including S steps connected in a feedforward manner, each block having an input and an output, wherein the input is $x^t$ and wherein the output($x^{(t+1)}$) of each block is represented as $x^{(t)} - \alpha_t(I-A^TA)\tan h(x^t)$, where t is the $t^{th}$ block of the S steps and $\alpha_t$ is a scalar variable for step t learned from the subset.

According to one aspect, a computer-implemented method includes receiving, using at least one processor, a dataset of sparse vectors from a requesting process, the vectors having a dimension of d, initializing an encoding matrix of dimension k×d, selecting a subset of sparse vectors from the dataset, and updating the encoding matrix via machine learning. Updating the encoding matrix includes using a linear encoder to generate an encoded vector of dimension k for each vector in the subset, the linear encoder using the encoding matrix, using a non-linear decoder to decode each of the encoded vectors, the non-linear decoder using a transpose of the encoding matrix in a projected subgradient, and adjusting the encoding matrix using back propagation. The method also includes returning an embedding of each sparse vector in the dataset of sparse vectors, the embedding being generated with the updated encoding matrix.

These and other aspects may include one or more of the following features. For example, the non-linear decoder may use S projected subgradient steps, where S is a predetermined number. In some implementations S is less than or equal to 60. As another example, the transpose replaces a pseudoinverse operation in the projected subgradient. As another example, the iterations continue until reconstruction error is minimized.

According to one aspect, a computer-implemented method includes receiving, using at least one processor, a dataset of sparse vectors from a requesting process, the vectors have a dimension of d, initializing an encoding matrix, selecting a sample set of sparse vectors from the dataset, and modifying, using the at least one processor, the encoding matrix via machine learning to minimize reconstruction error for the sample set of sparse vectors. The modifying may include generating an encoded vector of dimension k for each vector in the sample set using the encoding matrix, where k<<d, decoding each of the encoded vectors using an $l_1$-minimization decoder with S steps, where S is a predetermined number that is much lower than the number of steps needed to reach convergence, and using back propagation to adjust the encoding matrix. The method may also include providing the encoding matrix to the requesting process.

These and other aspects may include one or more of the following features. For example, the decoding may accomplished via a neural network including S blocks connected in a feedforward manner, each block having an input and an output, wherein the input is $x^t$ and wherein the output ($x^{(t+1)}$) of each block is represented as $x^{(t)} - \alpha_t(I-BA)\text{sign}(x^t)$, where t is the $t^{th}$ block of the S blocks and $\alpha_t$ is a scalar variable for step t learned from the sample set, and B is a learned matrix.

According to one aspect, a system includes a means for receiving a dataset of sparse vectors from a requesting process, a means for initializing an encoding matrix, a means for selecting a sample set of sparse vectors from the dataset, and a means for modifying the encoding matrix via machine learning to minimize reconstruction error for the sample set of the sparse vectors by generating an encoded vector of dimension k for each vector in the sample set using the encoding matrix, where k<<the dimensions of the sparse vectors, decoding each of the encoded vectors using a predetermined number of steps using a non-linear decoder, where the predetermined number of steps is lower than the number of steps needed to reach convergence, and using back propagation to adjust the encoding matrix. In some implementations, the system may also include providing the encoded matrix to the requesting process and/or providing an embedding of each of the sparse vectors, the embedding being generated using the updated encoding matrix.

According to certain aspects, a computer system includes a processor and memory having stored thereon instructions that, when executed by a processor, cause the system to perform any of the methods or operations disclosed herein.

According to certain aspects, a non-transitory computer-readable medium has code segments stored thereon, the code segments, when executed by a processor cause the processor to perform any of the methods or operations disclosed herein.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   receiving, using at least one processor of a computing device, a dataset of sparse vectors from a requesting process, the sparse vectors have a dimension of d;
   initializing an encoding matrix stored in a memory of the computing device;
   selecting a subset of sparse vectors from the dataset;
   modifying, using the at least one processor, the encoding matrix via machine learning to minimize reconstruction error for the subset of sparse vectors by:
      generating an encoded vector of dimension k for each vector in the subset using the encoding matrix, where k<d,
      decoding each of the encoded vectors using S projected subgradient steps, where S is a predetermined number that is lower than a number of steps used for convergence, and
      using back propagation to adjust the encoding matrix;
   generating an encoded dataset by encoding each vector in the dataset of sparse vectors using the encoding matrix; and
   providing the encoded dataset to the requesting process.

2. The method of claim 1, wherein k is proportional to an average of nonzero values in the sparse vectors of the dataset.

3. The method of claim 1, wherein each projected gradient descent step substitutes a transformation matrix for a pseudoinverse operation.

4. The method of claim 1, wherein the decoding is accomplished via a neural network including S blocks connected in a feedforward manner, each block having an input and an output, wherein the encoding matrix is A, the input is $x^t$ and wherein the output ($x^{(t+1)}$) of each block is represented as $x^{(t)}-\alpha_t(I-A^TA)\text{sign}(x^t)$, where t is the $t^{th}$ block of the S blocks and $\alpha_t$ is a scalar variable for step t learned from the subset.

5. The method of claim 4, wherein the dataset includes nonnegative sparse vectors and the method further comprises using rectified linear units in a last layer of the neural network.

6. The method of claim 4, wherein $\alpha_t=\beta/t$ where $\beta$ is learned from the subset.

7. The method of claim 1, wherein S is between two and ten.

8. The method of claim 1, wherein d is at least ten thousand.

9. A computer-implemented method comprising:
receiving, using at least one processor, a dataset of sparse vectors from a requesting process, the sparse vectors having a dimension of d;
initializing an encoding matrix of dimension k×d;
selecting a subset of sparse vectors from the dataset;
updating the encoding matrix via machine learning by iteratively performing:
using a linear encoder to generate an encoded vector of dimension k for each vector in the subset, the linear encoder using the encoding matrix,
using a non-linear decoder to decode each of the encoded vectors, the non-linear decoder using a transpose of the encoding matrix in a projected subgradient, and
adjusting the encoding matrix using back propagation; and
returning a respective embedding of each sparse vector in the dataset of sparse vectors, the respective embedding being generated with the updated encoding matrix.

10. The method of claim 9, wherein the non-linear decoder uses S projected subgradient steps, where S is a predetermined number.

11. The method of claim 10, wherein S is less than or equal to 60.

12. The method of claim 9, wherein the transpose replaces a pseudoinverse operation in the projected subgradient.

13. The method of claim 9, wherein the iterations continue until reconstruction error is minimized.

14. A computer-implemented method comprising:
receiving, using at least one processor, a dataset of sparse vectors from a requesting process, the sparse vectors having a dimension of d;
initializing an encoding matrix of dimension k×d;
modifying, using the at least one processor, the encoding matrix via machine learning to minimize reconstruction error for the dataset of sparse vectors by:
generating an encoded vector of dimension k for each vector in the dataset using the encoding matrix, where k<d,
decoding each of the encoded vectors using an $l_1$-minimization decoder with S steps, where S is a predetermined number that is lower than a number of steps needed to reach convergence, and
using back propagation to adjust the encoding matrix; and
providing the encoding matrix to the requesting process.

15. The method of claim 14, wherein the $l_1$-minimization decoder replaces a pseudoinverse operation with a transpose of the encoding matrix in a projected subgradient.

16. The method of claim 14, further comprising:
encoding the dataset of sparse vectors using the encoding matrix; and
providing the encoded dataset to the requesting process.

17. The method of claim 14, further comprising:
selecting a sample set of sparse vectors from the dataset, wherein modifying the encoding matrix via machine learning is performed on the sample set of sparse vectors from the dataset.

18. The method of claim 17, wherein the decoding is accomplished via a neural network including S blocks connected in a feedforward manner, each block having an input and an output, wherein the encoding matrix is A, the input is $x^t$ and wherein the output ($x^{(t+1)}$) of each block is represented as $x^{(t)}-\alpha_t(I-BA)\text{sign}(x^t)$, where t is the $t^{th}$ block of the S blocks and at is a scalar variable for step t learned from the sample set, and B is a learned matrix.

19. The method of claim 14, wherein the encoding matrix is initialized by generating a random matrix.

20. The method of claim 14, wherein S is 60 or less.

* * * * *

UNITED STATES PATENT AND TRADEMARK OFFICE
CERTIFICATE OF CORRECTION

PATENT NO. : 12,033,080 B2
APPLICATION NO. : 16/442203
DATED : July 9, 2024
INVENTOR(S) : Yu et al.

It is certified that error appears in the above-identified patent and that said Letters Patent is hereby corrected as shown below:

In the Claims

In Column 18, Claim 18, Line 37, delete "at" and insert --$α_t$--, therefor.

Signed and Sealed this
Twenty-second Day of October, 2024

Katherine Kelly Vidal
*Director of the United States Patent and Trademark Office*